(12) United States Patent
Maxey

(10) Patent No.: US 6,327,038 B1
(45) Date of Patent: Dec. 4, 2001

(54) LINEAR AND ANGULAR RETROREFLECTING INTERFEROMETRIC ALIGNMENT TARGET

(75) Inventor: L. Curtis Maxey, Powell, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/399,686

(22) Filed: Sep. 21, 1999

(51) Int. Cl.[7] .................................................... G01B 9/02
(52) U.S. Cl. ............................ 356/508; 356/450; 356/498
(58) Field of Search .................................. 356/511, 512, 356/513, 514, 498, 500, 508, 509, 510, 450

(56) References Cited

U.S. PATENT DOCUMENTS

| 4,227,807 | 10/1980 | Pond et al. . |
| 5,249,033 | 9/1993 | Maxey . |
| 6,017,125 | 1/2000 | Vann . |

FOREIGN PATENT DOCUMENTS

| 0018746 | 11/1980 | (EP) . |
| 0643282A1 | 3/1995 | (EP) . |

OTHER PUBLICATIONS

Maxey et al, "Automated Alignment System for Aspheric Mirrors," Abstract.

Maxey et al, "Novel Technique for Aligning Paraboloids" *Advanced Optical Manufacturing and Testing II*, 1531:147–155 (1991).

*Primary Examiner*—Frank G. Font
*Assistant Examiner*—Andrew H. Lee
(74) *Attorney, Agent, or Firm*—Quarles & Brady, LLP

(57) ABSTRACT

The present invention provides a method and apparatus for measuring both the linear displacement and angular displacement of an object using a linear interferometer system and an optical target comprising a lens, a reflective surface and a retroreflector. The lens, reflecting surface and retroreflector are specifically aligned and fixed in optical connection with one another, creating a single optical target which moves as a unit that provides multi-axis displacement information for the object with which it is associated. This displacement information is useful in many applications including machine tool control systems and laser tracker systems, among others.

36 Claims, 7 Drawing Sheets

LINEAR AND ANGULAR RETROREFLECTING INTERFEROMETRIC ALIGNMENT TARGET

STATEMENT REGARDING FEDERALLY SPONSORED RESEARCH OR DEVELOPMENT

The disclosed invention was made with government support under contract DE-AC05-96OR22464, awarded by the United States Department of Energy to Lockheed Martin Energy Research Corporation. The United States Government has certain right to this invention.

CROSS-REFERENCE TO RELATED APPLICATIONS

Not Applicable

FIELD OF THE INVENTION

The present invention relates to a method and apparatus for measuring the linear and angular displacement of an object. Specifically, the present invention discloses a method and apparatus for measuring both the linear and angular displacement of an object using a single optical target and a linear interferometer system.

BACKGROUND OF THE INVENTION

Many of today's manufacturing and inspection processes require precision dimensional measurements to ensure quality control and successful job completion. Displacement measuring "linear" interferometer systems capable of providing sub-micron linear displacement measurements are frequently employed in these applications.

Linear interferometers are simple in nature and serve a practical use when it is desired to measure the linear displacement of an object along a single axis. Linear interferometers typically combine a laser light source and interferometer with an optical target to obtain a displacement measurement. The laser light source provides a collimated beam of light which is directed towards a single reflecting element forming the optical target. The reflecting element, which is typically a prism, directly receives the collimated beam of light and reflects it back to the interferometer where it provides an optical reference as to the targets mechanical location along a single axis.

Linear interferometers are applied to a number of measurement tasks. One such task includes their use in manufacturing processes to provide precise feedback control of machine tool movements. In these systems the linear interferometers are imbedded into the machine tools and set to interact with certain optical targets mounted on critical reference surfaces of the machines. Typically these systems use one light beam per axis of movement. For example, a machine which moves along three axes will use three separate measurement beams to measure the machines displacement. Each light beam provides a measurement of the distance from the interferometer to the optical target. The exact displacement of the machine tool is then determined by the combined displacement information from the three axes.

Linear interferometer systems are also used to provide precise three dimensional measurements for the inspection and characterization of large surfaces, i.e., those found on turbines for hydraulic and nautical applications and mirror blanks for large telescopes. The systems utilized in these applications are known as "laser trackers" and consist of a linear interferometer system in which the laser light beam can be directed angularly from a fixed point towards the optical target. The optical target, once again, provides a means for directing the light back to the interferometer and serves as an optical reference point for a mechanical location. In its operation, the optical target is initially stationed in a precisely determined reference location and then removed by hand and placed against the surface of the object to be measured. As the optical target is moved by hand, the laser tracker beam follows the target using feedback control until it is placed at the point on the surface to be measured. The linear displacement of the target on the referenced location is then determined by the linear interferometer. The angular displacement of a target from the referenced location is determined by encoders on the optical system that directs the beam to the target via feedback control.

While these and other interferometer systems have enhanced inspection processes and proven essential in enabling the growth of the ultra-precision machine tool industry, they are not without their limitations. One key limitation lies within the fact that a linear displacement measurement alone fails to provide a complete picture of the true motion of the optical target. Ideally, one would seek to know all six degrees of freedom in which the target is moving, i.e., the three translational and three rotational degrees of freedom, and not just the movement along a single axis. The current linear interferometer systems are unable to adequately provide these measurements without compromising the original measurement of the translational displacement of the object along its measuring beam's optical axis.

Considering the examples described above, this limitation severely affects the ability of the manufacturing and inspection processes to function at their full potential. For example, machine tools, while designed to move in exact straight lines along their individual axes, always exhibit angular, translational, and rotational variations from perfect straight line movement. As manufacturing tolerances have become tighter over time, these errors have limited the ability of manufacturers to meet the manufacturing tolerances with their existing machines. In many cases, investing in more rigid and straighter machines is the only solution for achieving the tighter tolerance requirements.

It is recognized, however, that deviations from true straight line motion along the machine tool axis is tolerable if adequate measurement and compensation exist. This is typically achieved by a process called "machine tool error mapping" and may involve the use of several measurement systems to characterize repeatable machine tool errors caused by motion activities. Non-repeatable motion errors, however, (e.g., errors resulting from loading variations which are not reproducible from case to case) are not accounted for in the error mapping process and typically lead to errors in manufacturing.

As for linear interferometers utilized in inspection processes, the current systems are limited, once again, by the fact that they are only capable of measuring the linear displacement of the optical target along a single axis using one optical beam. Moreover, they fail to provide the capacity to monitor additional degrees of motion, i.e., pitch and yaw. These systems are also not capable of measuring the slope of the surface itself, thus resulting in an increase in the number of measurement points necessary to fully characterize the shape of the surface. Surfaces which are hidden (i.e., hidden behind obstacles such that they are not reached by the laser beam) also remain unmeasured by the current systems.

The need for machine tool systems having multi-axis measurements is well known and attempts are being made to address those needs by various interferometer manufacturers. For example, passive (i.e., consisting only of optical elements and no electronics) interferometric "targets" are manufactured to address angular measurement needs. However, these targets only provide one axis of angular measurement for a single optical beam and result in deteriorated displacement information. Another manufacturer provides a multi-axis "active" (i.e., contains photo detectors and electronics) target that monitors five degrees of motion, namely, displacement along the optical axis, and x and y translation perpendicular to the axis, pitch and yaw. Unfortunately, this system requires more than one optical beam and connection back to the laser source and interferometer system via wires. Consequently, these systems are not intrinsically compatible with the lasers and optical components used in conventional single beam linear interferometer systems.

U.S. Pat. No. 5,249,033, issued to the same inventor hereto and incorporated herein by reference, discloses a novel approach for aligning optical reflectors utilizing a method which allows the extraction of three-axis alignment information from a single optical beam. The development of a single optical beam multi-axis (displacement, pitch and yaw) interferometer measurement system was first developed to solve the difficulties associated with aligning, optical systems which employed aspheric (or non-spherical) reflecting, surfaces. The disclosed system provides for the use of a corner cube retroreflector to align a parabolic mirror segment to a fixed interferometer utilizing a single diverging optical beam provided by a lens. The lens is contained as part of the interferometer and causes the beam of the interferometer to converge to a focus. The paraboloidal segment is placed in an alignment such that the focus of the paraboloid is very near to the focus of the light from the interferometer lens, and such that a line passing through the center of the aperture of the paraboloidal segment and through the vertex of the parent paraboloid is parallel to the horizontal reference plane of the measurement system. Rotation about the axis formed by this line is defined as pitch. The corner cube retroreflector reflects the light from the paraboloidal segment back into the segment and thence into the interferometer where an interferogram is generated. The interferogram produced by the combination of the interferometer, lens, parabolic reflector, segment and corner cube retroreflector contains unique information about the pitch, yaw and linear displacement of a parabolic reflector segment relative to the interferometer. An electro-optical system interprets this information and implements it in an automated alignment system which makes certain adjustments to the position of the paraboloidal segment until the focus of the lens and the focus of the segment are co-located. The paraboloidal segment is moved relative to the interferometer and corner cube, which remain fixed with respect to each other.

BRIEF SUMMARY OF THE INVENTION

It is an object of the present invention to provide a method and apparatus capable of characterizing the displacement of an object in more than one degree of freedom using a single optical target and a single light beam from a linear interferometer.

It is another object of the present invention to provide a passive interferometric measurement system capable of obtaining simultaneous displacement measurements in more than one degree of freedom.

It is yet another object of the present invention to provide a method and apparatus for tracking an object's displacement along a linear axis and two degrees of rotational freedom using an optical target which moves as a single unit.

These and other objectives are accomplished by the method and apparatus of the present invention. The present invention is summarized in that it provides a method and apparatus for characterizing the angular and linear displacement of an object utilizing a linear interferometer system and an optical target comprising a lens, a reflecting surface and a retroreflector. The lens, reflecting surface and the retroreflector are aligned and fixed in optical contact with one another, creating a single optical target which moves as a unit to provide the displacement information of an object with which it is associated.

To obtain the displacement information of the object, a collimated beam of light from an interferometer is transmitted to the optical target where it passes through the lens, is focused to a point, and diverges onto the reflecting surface. The reflecting surface is aligned and optically connected with the lens such that the diverging beam of light from the lens is approximately collimated by the reflecting surface and reflected from the reflecting surface to the retroreflector. The beam of light is then reflected back to the reflecting surface by the retroreflector along a path parallel to which it came, where it is reflected by the reflecting surface into the lens and into an interferometric imaging system. The interferometric imaging system interferes the returned light with the original source of illumination producing an interferogram which simultaneously characterizes the angular and linear displacement of the optical target.

In one embodiment, an achromatic lens, a paraboloidal reflecting surface and a cube corner retroreflector are employed to form an optical target which moves as a single unit. The lens, reflecting surface and cube corner retroreflector may be aligned and fixed to each other to form a single monolithic optical target, a multi-piece target, or individually affixed to the object itself in the proper alignment as disclosed herein.

One advantage of the present invention is that it provides a method and apparatus that utilizes a single optical beam and a single optical target to measure the displacement of an object along three of its six degrees of freedom.

Another advantage of the present invention is that the method and apparatus is able to measure two of the three degrees of rotational freedom without compromising the original displacement information for translational displacement along the optical axis of the measurement optical beam.

Yet another advantage of the present invention is that the method and apparatus is capable of providing the linear and angular displacement information for an object without the need of wire connections between the optical target and the measurement system employed.

Still yet another advantage of the present invention is that it provides a method and apparatus which reduces the number of measurement points necessary to adequately inspect and characterize large surfaces.

These and other objects and advantages of the invention are readily understood in view of the following figures and detailed description.

DETAILED DESCRIPTION OF THE INVENTION

The present invention discloses a method and apparatus for characterizing the linear, pitch and yaw displacement of an object using a single optical target and a single collimated beam of light from a linear interferometer. Specifically, the present invention discloses the use of a lens, a reflecting surface and a retroreflector aligned in a fixed relationship and in optical connection to each other such that they collectively provide an optical target for the collimated beam of light. The alignment of the lens, reflecting surface and retroreflector allows reflection of the collimated beam back to the linear interferometer in a characteristic manner which preserves the beam's linear displacement information and provides angular displacement information of the object in the pitch and yaw angular axes.

Figure 1:
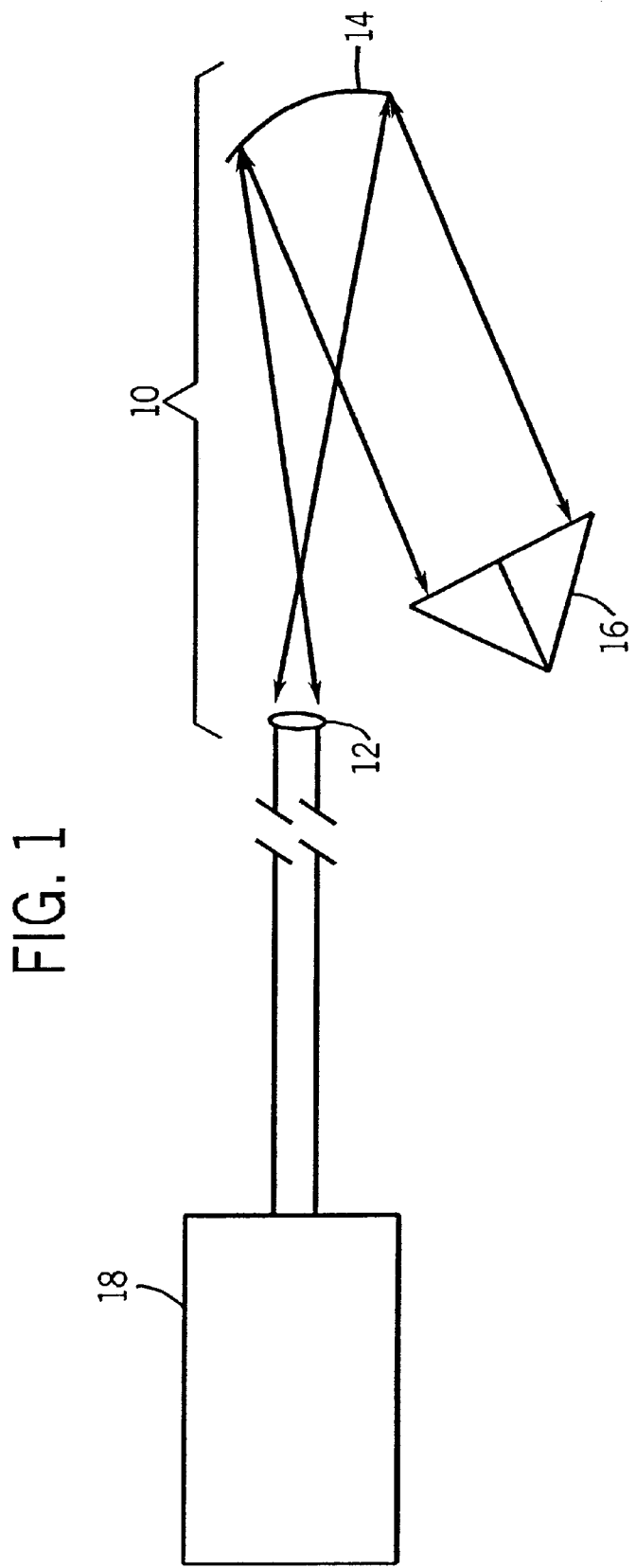
FIG. 1 is a simple illustration of the optical target according to the present invention.
Figure 2:
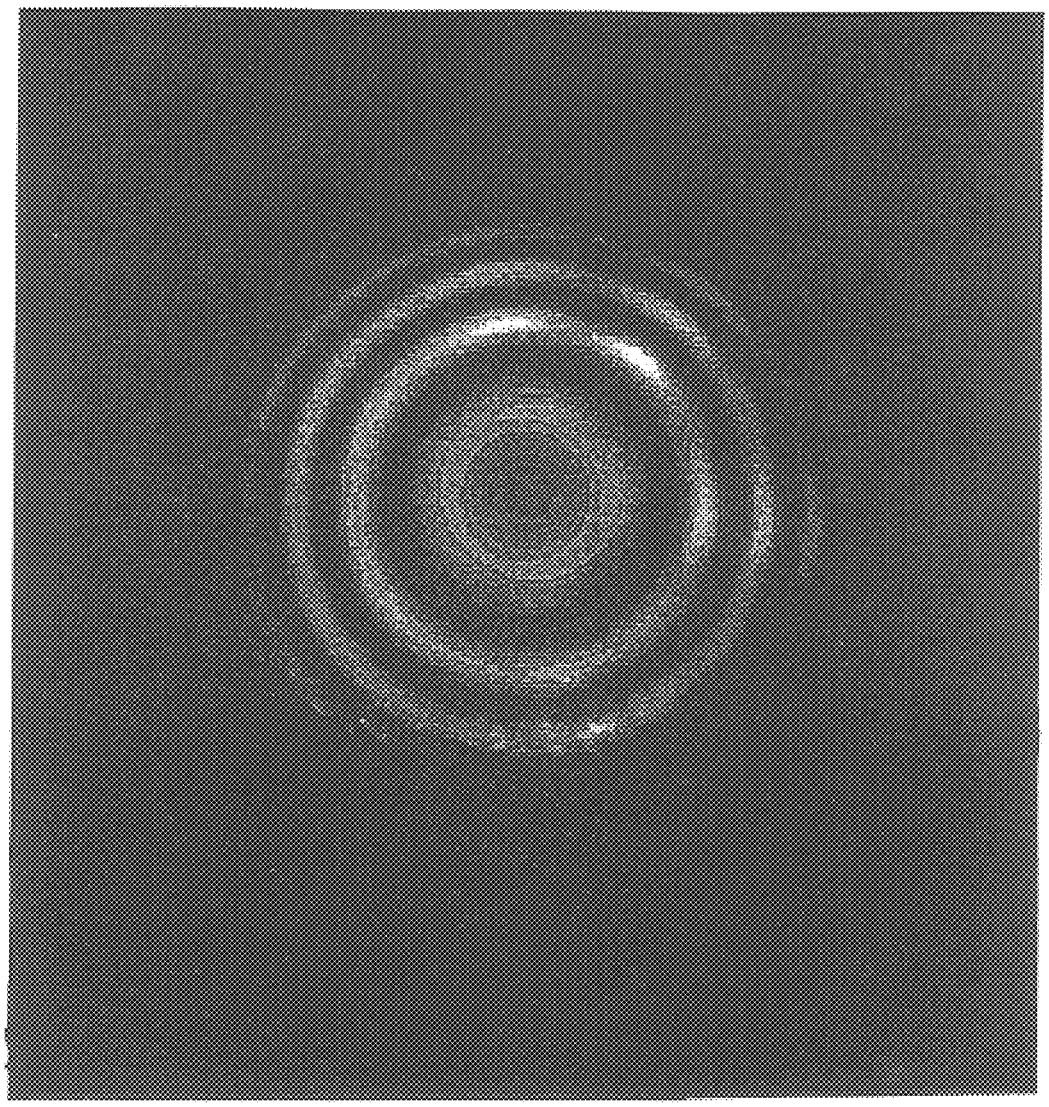
FIG. 2 is a digital illustration of an interferogram produced in accordance with the present invention showing the circular, bull's-eye-like interference fringe pattern generated in the absence of any angular displacement of the optical target.

Referring to FIG. 1, the present invention generally employs a lens 12, a reflecting surface 14, a retroreflector 16, a light source and interferometric imaging system 18. The lens 12 is aligned and fixed in optical connection with the reflecting surface 14 to focus a collimated beam of light from the light source 18 into the focal point of the reflecting surface 14. The reflecting surface 14 is further aligned and fixed in optical connection to the retroreflector 16 to approximately collimate and reflect the beam of light received from the lens 12 to the retroreflector 16 in a manner which allows the beam of light to reflect back from the retroreflector 16 to the reflecting surface 14 along a path parallel to the direction in which it was received. The re-reflected beam of light is then reflected from the reflecting surface 14 to the lens 12 and into the interferometric imaging system 18. The reflecting surface 14 is also aligned and optically connected with respect to the focus of the lens 12 so as to maintain some degree of defocus and provide circular interference fringes (as shown in FIG. 2) when the beam of light is measured interferometrically. A process useful in aligning the lens 12, reflecting surface 14 and the retroreflector 16 is discussed at length in U.S. Pat. No. 5,249,033, which is incorporated herein by reference.

The lens 12, reflecting surface 14 and the retroreflector 16, once aligned, are fixed with respect to one another creating the optical target 10 which moves as a single unit with respect to the incident beam of light from the light source and imaging system 18. The optical target 10 is typically placed in combination with an object in which the characterization of the object's angular and linear displacement, or the linear and angular displacement along a surface associated with the object, is desired. The optical target 10 may be assembled as a single piece and rigidly affixed to the object or, in the alternative, the lens 12, reflecting surface 14 and/or the retroreflector 16 may be individually affixed to the object in the alignment as described above.

The lens 12 may comprise any single element, multi-element, diffractive or hybrid lens (i.e., a lens having a diffractive surface combined into a single element or a multi-element lens) commonly known to focus light from a collimated source. Preferably, the lens employed is a positive lens which produces a real focus on the side opposite of the collimated beam. It is understood, however, that the lens utilized could easily be a negative lens that will produce a virtual focus on the same side of the lens as the collimated beam and a diverging light on the opposite side of the lens. Preferably, however, the lens employed is a multi-element lens and more preferably an achromatic lens. The achromatic lens is preferred because it introduces fewer aberrations into the beam. Although the achromatic lens is preferred, it is anticipated that other lenses may also provide similar clarity and function.

The reflecting surface 14 is generally defined as a surface which is capable of both collimating and angularly displacing the incident light. Preferably, the reflecting surface utilized is an off-axis segment of a paraboloidal reflector. It is anticipated, however, that other reflecting optical elements, including reflecting diffractive elements, are capable of use as a reflecting surface in the present invention. Such elements may include, but are not limited to diffractive reflectors or refractive elements combined with conventional or diffractive reflectors to achieve the function of angularly displacing and simultaneously collimating the light in a manner similar to that of the paraboloidal segment. The reflecting surface may also be, in some instances, a refractive or diffractive transmissive element capable of both collimating and angularly displacing the incident light.

The retroreflector 16 is generally defined as a reflector that is capable of reflecting an approximately collimated beam of light along a path parallel to the direction in which it was received. Preferably, the retroreflector comprises a cube corner retroreflector having three mirrors displaced at 90 degree angles from each other forming the shape indicative of the corner of a cube. It is anticipated, however, that one may employ other retroreflectors capable of serving the same purpose. An alternate retroreflector may include, but is not limited to, a spherical retroreflector commonly known as a "cat's eye" reflector.

The light source and imaging system 18 may comprise any system capable of interferometrically measuring linear displacement according to a single collimated beam of light. Preferably, the light source and interferometric imaging system is a single beam linear interferometer.

The process can best be described by first designing an appropriate coordinate system based on pitch, yaw, and focus. The pitch and yaw coordinates specify rotation of the optical target, and its associated object, about two orthogonal axes. A pitch axis is orthogonal to the optical axis of the parent paraboloid, parallel to the horizontal reference plane of the measuring system. Pitch is a measure of rotation of the optical target about this axis. A yaw axis is orthogonal to the optical axis of the parent paraboloid, normal to the horizontal reference plane of the measuring system. Yaw is a measure of rotation about this axis. The third, or linear displacement axis, allows specification of translation along a direction parallel to the optical path of the interferometer.

To measure the linear and angular displacement of an object, a collimated (or parallel and non-diverging) beam of light from the light source 18 is directed at the lens 12. The lens 12 causes the beam of light to be focused into the focal point of the reflecting surface 14. The reflecting surface 14 approximately collimates the beam of light and reflects the beam of light to the retroreflector 16 where it is reflected back to the reflecting surface 14 along a path parallel to the direction in which it was received. The reflecting surface 14 then causes the beam of light to converge to a focus near the focal point of the lens 12 where it is approximately collimated and directed to the imaging system 18 and combined with a portion of the originating light to produce an output signal, i.e., an interference pattern. This output signal is commonly known as an interferogram and is interpreted to determine the pitch and yaw angular displacement of the object with which the optical target is associated. Linear displacement data is presented and interpreted from the output signal in the normal manner.

Figure 3:
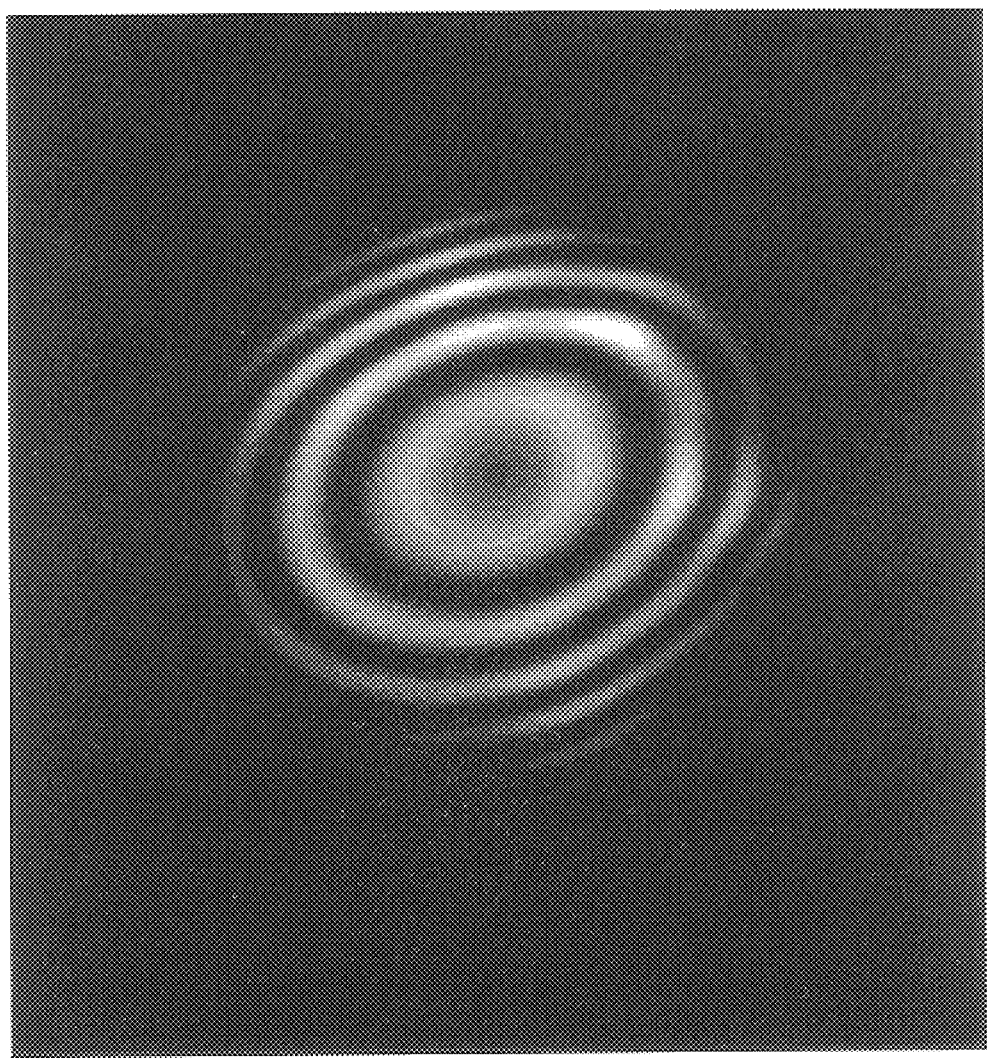
FIG. 3 is a digital illustration of an interferogram produced in accordance with the present invention showing elongation and rotation of the concentric interference fringes due to a pitch and yaw displacement of the optical target.
Figure 4:
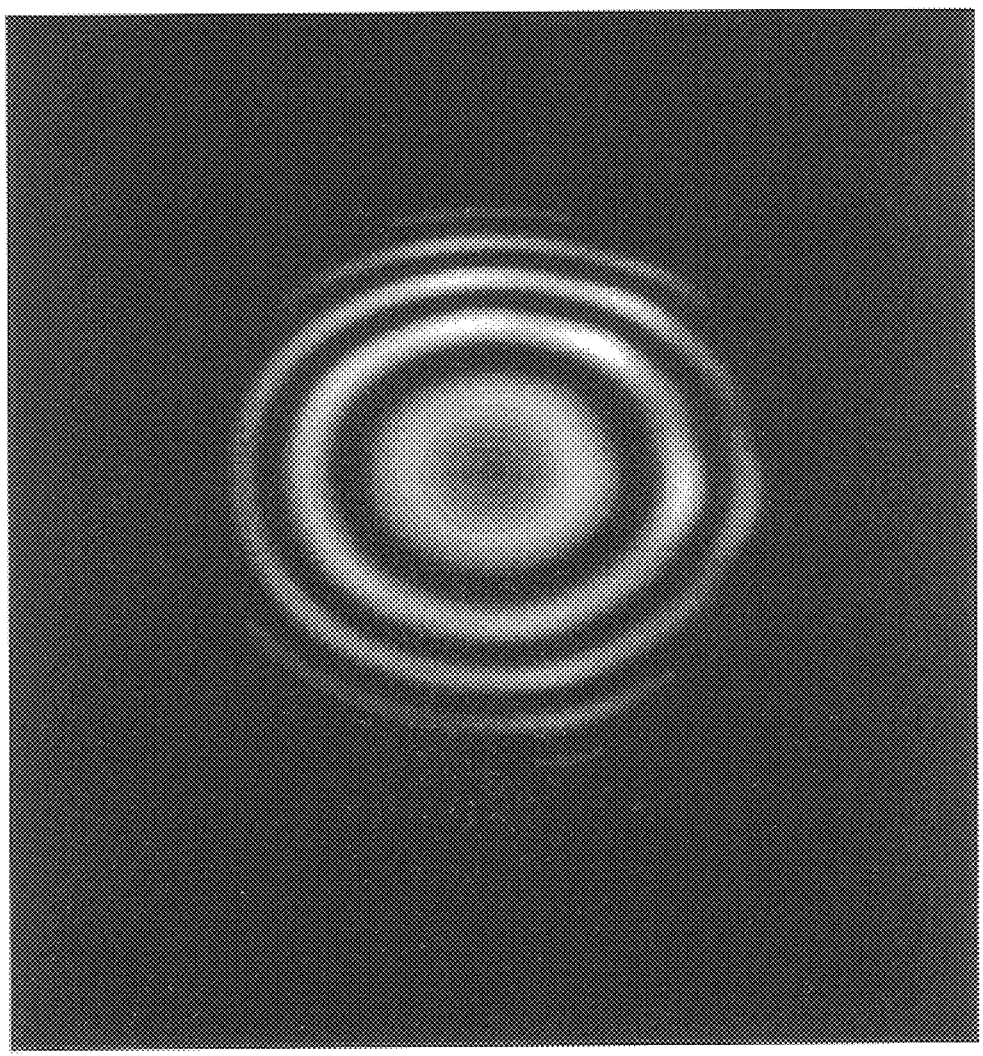
FIG. 4 is a digital illustration of an interferogram produced in accordance with the present invention showing yaw displacement of the optical target.
Figure 5:
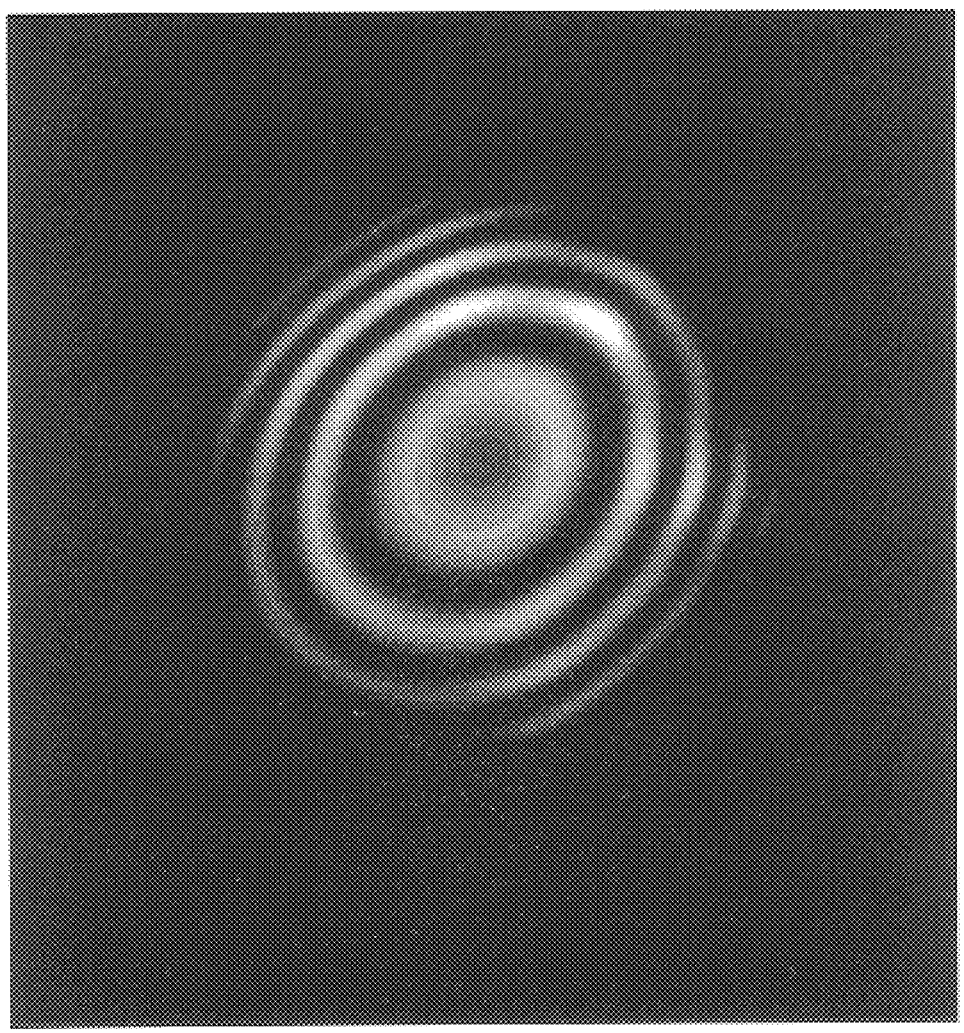
FIG. 5 is a digital illustration of an interferogram produced in accordance with the present invention showing pitch displacement of the optical target.

The determination as to the amount of linear or angular displacement is based upon a comparison of the object's output signal in a perfectly aligned position versus its output signal in the displaced position. Ideally, when the object is in a perfectly aligned position, the optical target 10 is aligned so that it is normal to the beam of light from the light source 18. When the optical target 10 is aligned so that it is normal to the beam of light (i.e., with no pitch or yaw present in the alignment), the light returned from the optical target 10 to the imaging system 18 produces interferograms that consist of circular, bull's-eye-like interference fringes. FIG. 2. When yaw and/or pitch exists, these concentric fringes are aberrated and become elongated and/or rotated with respect to the interferometer frame of reference. FIGS. 3–5. The center fringe of the bull's-eye pattern preserves the information necessary to discern linear displacement through one of several means that are commonly implemented by other linear interferometer systems.

The production of the interference patterns is a result of the displacement of the optical target relative to the incident beam of light. For example, as the optical target is displaced by the displacement of the object, the lens, reflecting surface, and retroreflector fixed within the optical target are also displaced. As the incident beam of light passes through the lens, onto the reflecting surface and onto the retroreflector, its reflected wave front is changed resulting in a new interference pattern in the imaging system and an aberrated interferogram. The aberrated interferogram, in turn, reveals the angular displacement.

It is understood that to be mechanically useful, the object to which the optical target is combined must contain one or more associated surfaces or points that have a meaningful relationship to the measurement system when the target is "perfectly" aligned to the interferometer beam and producing the interference patterns described above. If the invention is displaced in a manner such that the incident light remains centered on the lens but the angle of incidence is displaced slightly in pitch and yaw, interference fringes are produced in the form of ovals that are angularly displaced from the horizontal axis. The number, shape, and orientation of the interference fringes provide specific information that is independently and simultaneously interpreted to determine pitch, yaw and linear displacement of the optical target and its associated object. One approach to a interpretation of these fringes is discussed by Maxey et al., in "Automated Alignment System for Aspheric Mirrors," *Interferometry: Surface Characterization and Testing,* Proc. SPIE 1776:130–139 (Creath and Greivenkamp eds. (1992)), which is incorporated herein by reference.

Fringes produced through computer modeling of this embodiment with pitch and yaw displacement are shown in FIG. 3. The angular displacement information is contained in the non-circular shape of the fringes. A displacement purely in the yaw axis produces fringes that are elongated but maintain an orthogonal orientation to the measurement system axes, as shown in FIG. 4. It can be said that the fringes have lost their rotational symmetry but have maintained a bilateral symmetry about the horizontal axis. The addition of pitch displacement, however, causes the fringes to lose their orthogonal relationship to the measurement system axis. A displacement purely in the pitch axis produces fringes that are no longer bilaterally or rotationally symmetric, as shown in FIG. 5.

Linear displacement along the axis described by the single light beam from the linear interferometer will result in modulation of the central fringe of the bull's-eye pattern. The central fringe will pass from dark to light and back to dark in a relationship that is proportional to the linear displacement and the wavelength of light used in the interferometer source. This modulation from dark to light is identical to the type of modulation that is common to all linear interferometers using their conventional single axis optical measurement targets.

FIG. 2 shows an image with a high degree of bilateral and radial symmetry. The degree of symmetry is determined according to the intensity distributions. If the image is bilaterally symmetric as in FIGS. 2 and 4, there is no pitch error. If the fringes are bilaterally symmetric but not radially symmetric, then there is no pitch error but yaw error. FIG. 4. A computer system designed to interpret the interferograms may be employed to identify and quantify the influence of pitch and yaw displacement on the interferograms by computing the movements necessary to align the system to achieve circular, concentric fringes, or by simply comparing the displaced interferogram with the aligned interferogram.

Referring to FIG. 1, the preferred embodiment of the present invention employs an achromatic lens 12, an off-axis segment of a paraboloidal reflector 14, a cube corner retroreflector 16, and a single beam linear interferometer 18. By convention, the lens 12 is a positive lens which produces a real focus on the opposite side of the lens 12 from the collimated beam. The off-axis paraboloid segment 14 is aligned in a manner such that an imaginary line passing from the vertex of the parent paraboloidal surface through the center of the off-axis paraboloid segment 14 is parallel to the horizontal reference plane of the interferometer light source 18. By convention, all descriptions herein are written with the assumption that the imaginary line is oriented with respect to the horizontal plane of the measurement system, although it will be understood that the imaginary line could be referenced to the vertical plane if all references to "pitch" are interpreted as "yaw" and all references to "yaw" are interpreted as "pitch".

By perfectly aligning the focus of the paraboloid segment 14 to the focus of the lens 12, as discussed in U.S. Pat. No. 5,249,033, the reflected light is both collimated and angularly displaced from its original axis of propagation. A slight displacement of the paraboloid segment 14 along the original axis of propagation will result in a very small amount of defocus which is indicated interferometrically as concentric, symmetric, circular fringes. The cube corner retroreflector 16 is placed in the path of the approximately collimated beam so as to reflect the beam in a manner parallel to its direction of travel and back into the surface of the paraboloid segment 14. The light is reflected from the paraboloid segment 14 such that the light is refocused near the original focal point of the focusing lens 12. The lens 12, in turn, receives the light and re-collimates it for its final journey back to the linear interferometer 18 for interpretation.

Ideally, the interpretation of the displacement information is performed by a linear interferometer associated with a computer system capable of interpreting the concentric fringe patterns and providing the object's linear and angular displacement. Because the interpretation is based upon a relatively simple comparison of the interference pattern shape, orientation and density, the software and hardware for the computer system does not require a high level of sophistication. One such system may include an interferometer whose output signal is passed through a camera to an image processing system where the image is digitized for subsequent interpretation by a digital computer. The computer, in turn, compares an aligned image previously obtained with the displaced image and computes the amount of displacement along the linear axis and the displacement according to pitch and yaw.

In the preferred embodiment, the achromatic lens 12, paraboloid segment 14 and the cube corner retroreflector 16 are aligned as described above such that the collimated light from the paraboloid contains some defocus that can be interferometrically identified but is otherwise aligned to produce perfectly collimated light. After interfering the light with the reference beam in the interferometer, as is well known in the field of interferometry, interference fringes are produced which are "perfectly" circular and concentric in form.

Figure 6:
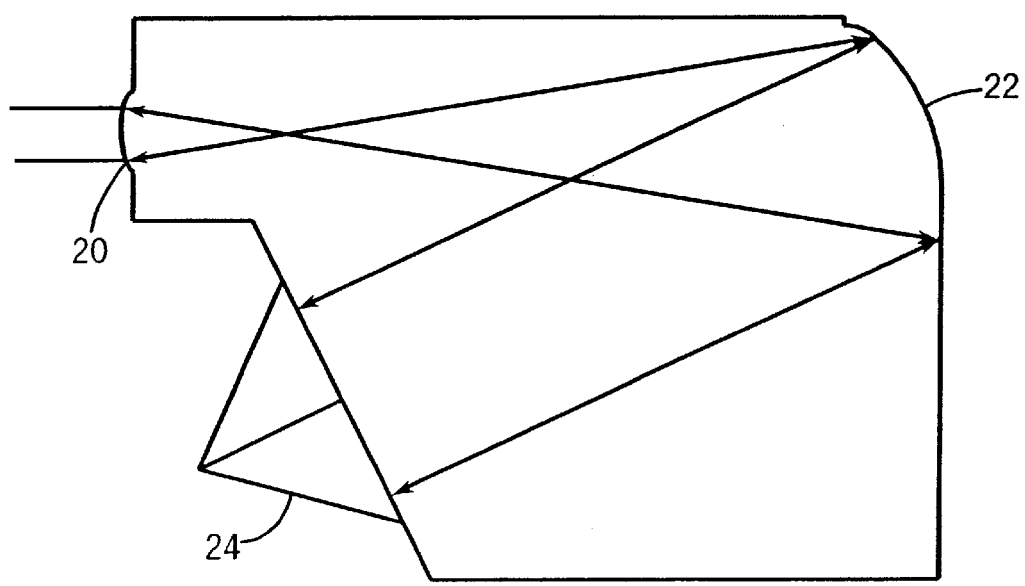
FIG. 6 is a diagram of an embodiment of the present invention wherein the lens, reflector and retroreflector are placed in a monolithic configuration.

It will be appreciated by those skilled in the art that alternate embodiments from the preferred embodiment may exist or may come to exist to achieve the functions of the described optical elements. In particular, the use of alternate means of constructing the system, the use of diffractive optical elements, and alternate forms of retroreflectors are anticipated. For example, as shown in FIG. 6, a monolithic configuration of the present invention is envisioned, in which all or some of the elements are constructed from a suitable substrate. This system would contain the lens 20, reflecting surface 22 and cube corner retroreflector 24 necessary to construct the system out of a single piece of material. In this embodiment, any two or all of the three elements are constructed in a single monolithic piece. This element may be produced through precision machining or through replication processes. The cube corner retroreflector 24 may be produced as either an intrinsic part of the monolith or attached to the monolith as a separate element.

Figure 7:
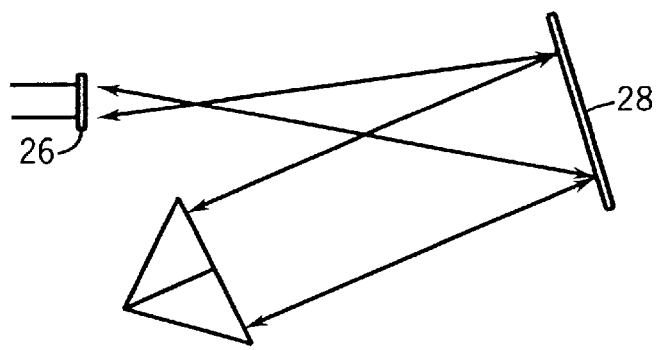
FIG. 7 is a diagram of an embodiment of the present invention utilizing a diffractive element as the reflecting surface.

It is further anticipated that diffractive optical elements are capable of use in the present invention. Diffractive optical elements are capable of use in a variety of circumstances to achieve the functions usually identified with refractive and reflective elements. Those skilled in the art will recognize that diffractive elements may replace the elements described in the preferred embodiment. One such embodiment using diffractive elements is shown in FIG. 7. In this embodiment, both the lens 26 and the reflecting surface 28 are shown as diffractive elements although it will be understood that either or both elements could be diffractive in nature without comprising the performance of the system.

Figure 8:
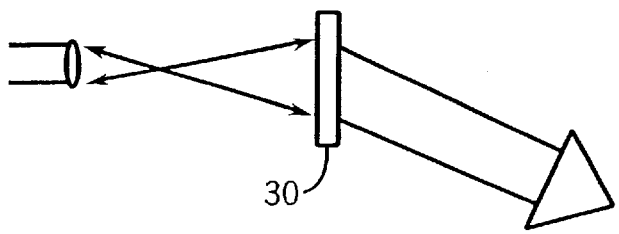
FIG. 8 is a diagram of an embodiment of the present invention utilizing a refractive or diffractive transmissive element functioning as the reflecting surface.

Although system size and convenience of implementation guide the embodiments described so far, those skilled in the art will readily appreciate that a refractive or diffractive transmissive element 30 is capable of use in place of the reflecting surface to achieve the collimating and angular displacement of the optical beam before the retroreflector, as shown in FIG. 8.

Figure 9:
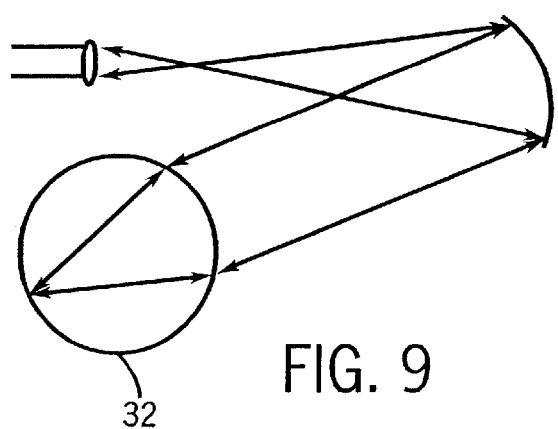
FIG. 9 is a diagram of an embodiment of the present invention utilizing a spherical retroreflector.

It is well known that retroreflectors other than corner cubes can be constructed. Commonly, spheres are used in retroreflectors, as is well known from their use in roadway signs. In these retroreflectors, the light incident on the reflector is focused onto the back surface of the sphere. From there, it reflects parallel to the incident beam as in the implementation of the corner cube retroreflector. One such embodiment making use of a spherical retroreflector 32, also known as a "cat's eye" reflector, is shown in FIG. 9. It will be realized, however, that it would function with equal virtue in all other implementations using the corner cube retroreflector.

The present invention provides a completely passive optical target that is compatible with existing single beam systems and achieves three degrees of measurement information. Because the present invention uses a single optical beam indistinguishable from those already used in linear interferometer systems on machines, it is readily applicable to on-line use. This makes it applicable to on-line measurements of non-repeatable machine tool errors typically caused by loading, temperature, or other factors. Further, the invention is compatible with the optical systems and components presently used for laser sources and interferometers commonly used in the machine tool industry. The invention only requires the application of appropriate imaging and signal processing approaches to extract the two additional degrees of measurement information. It does not require any connections back to the laser source or interferometer beyond that provided by the single optical beam systems presently used in existing machine tool controls and laser tracker systems.

The present invention also significantly enhances the capabilities of laser tracker systems by monitoring two additional degrees of motion along with linear displacement. The present invention provides additional information in a way that is compatible with existing optical systems, requiring only the application of appropriate imaging and signal processing approaches to extract the two additional degrees of measurement information. With the enhanced laser tracker system provided by this invention, it is possible to measure the slope of a surface, as well as the linear displacement to the surface. This information can reduce the number of measured points necessary to fully characterize the surface's shape.

In addition, the location of "hidden" surfaces (i.e., those that are behind an obstacle and unreached by the laser beam) are enabled by this invention. Hidden surfaces may be located with the aid of an extension arm that is terminated at the referenced spherical surface known as a "tooling ball". The referenced arm can pass behind the obstacle and touch the hidden surface with the tooling ball. An independent means of controlling the "roll" of a target, also called "leveling" the target, is all that is needed to ensure that the displacement, pitch, yaw, extension arm length, and tooling bar diameter are combined to establish the location of the measured point of the "hidden" surface.

The method and apparatus of the present invention may also be used with a linear interferometer system to serve as a "null indicating" target. In this application, the optical target is used to identify and remove alignment errors according to a continuous and systematic interpretation of the interference fringes by the interferometer imaging system.

It is also anticipated, that the interferograms can be interpreted to determine the pitch and yaw information in a manner that is both direct and quantitative. In this application, the optical target is oriented so that a mechanical reference on the optical target bears some meaningful relationship with the object being monitored. The optical target is then systematically aligned according to the determined pitch and yaw measurements. By measuring the angular displacements necessary to return the target to a perfectly aligned or a null indicating position, the angular displacement of the measured system is also determined. During this process, the linear displacement information is continuously monitored as well to preserve the three-axis formation.

While there has been shown and described what are at present considered the preferred embodiments or variations of the invention, it will be obvious to those skilled in the art that various changes and modifications can be made therein without departing from the scope of the invention. Accordingly, it should be understood that the examples and embodiments described herein are for illustrative purposes only and that various modifications or changes will be suggested to persons skilled in the art, and that they are included within the spirit and purview of this invention. It is also understood that the invention can take other specific forms without departing from its spirit or essential attributes.

I claim:

1. A method for simultaneously characterizing the displacement of an object in more than one degree of freedom comprising the steps of:

attaching to the object an optical target comprising a lens, a reflecting surface that angularly displaces and approximately collimates light, and a retroreflector that reflects collimated light in more than one optical plane, wherein the lens, the reflecting surface and the retroreflector are fixedly spaced apart and in optical connection with each other, and are maintained in a fixed physical relationship relative to each other;

transmitting a collimated beam of light from a light source into the lens from which the beam of light is focused from the lens into a focal point of the reflecting surface, from which the beam of light is approximately collimated and reflected to the retroreflector, from which the beam of light is reflected back to the reflecting surface along a path parallel to the direction in which it was received, and from which the beam of light reflected back to the reflecting surface from the retroreflector is transmitted through the lens and into an interferometer imaging system to produce an output signal; and interpreting the output signal to simultaneously characterize displacement of the object in more than one degree of freedom.

2. The method of claim 1 wherein the lens is a multi-element lens.

3. The method of claim 2 wherein the lens is an achromatic lens.

4. The method of claim 1 wherein the lens is a diffractive optical element.

5. The method of claim 1 wherein the lens is a hybrid lens.

6. The method of claim 1 wherein the reflecting surface is a diffractive element.

7. The method of claim 1 wherein the reflecting surface is an off-axis segment of a paraboloidal reflector.

8. The method of claim 1 wherein the reflecting surface is an aspheric mirror segment.

9. The method of claim 1 wherein the retroreflector is either a cube corner retroreflector or a spherical retroreflector.

10. The method of claim 1 wherein a computer characterizes the displacement of the object according to aberrations in the output signal produced in the imaging system.

11. A method for simultaneously characterizing the displacement of an object in more than one degree of freedom comprising the steps of:

attaching to the object an optical target comprising a lens, a paraboloidal reflecting segment, and a retroreflector, wherein the lens, the reflecting segment and the retroreflector are fixedly spaced apart and in optical connection with each other, and are maintained in a fixed physical relationship relative to each other;

transmitting a collimated beam of light from a light source into the lens from which the beam of light is focused from the lens into a focal point of the reflecting segment, from which the beam of light is approximately collimated and reflected to the retroreflector, from which the beam of light is reflected back to the reflecting segment along a path parallel to the direction in which it was received, and from which the beam of light reflected back to the reflecting segment from the retroreflector is transmitted through the lens and into an interferometer imaging system to produce an output signal; and interpreting the output signal to simultaneously characterize displacement of the object in more than one degree of freedom.

12. The method of claim 11 wherein the lens is a multi-element lens.

13. The method of claim 12 wherein the lens is an achromatic lens.

14. The method of claim 11 wherein the lens is a diffractive optical element.

15. The method of claim 11 wherein the lens is a hybrid lens.

16. The method of claim 11 wherein the retroreflector is either a cube corner retroreflector or a spherical retroreflector.

17. The method of claim 11 wherein a computer characterizes the displacement of the object according to aberrations in the output signal produced in the imaging system.

18. A method for simultaneously characterizing the displacement of an object in more than one degree of freedom comprising the steps of:

attaching to the object an optical target comprising a lens, a reflecting surface, and a cube corner retroreflector, wherein the lens, the reflecting surface and the cube corner retroreflector are fixedly spaced apart and in optical connection with each other, and are maintained in a fixed physical relationship relative to each other;

transmitting a collimated beam of light from a light source into the lens from which the beam of light is focused from the lens into a focal point of the reflecting segment, from which the beam of light is approximately collimated and reflected to the cube corner retroreflector, from which the beam of light is reflected back to the reflecting segment along a path parallel to the direction in which it was received, and from which the beam of light reflected back to the reflecting segment from the retroreflector is transmitted through the lens and into an interferometer imaging system to produce an output signal; and interpreting the output signal to simultaneously characterize displacement of the object in more than one degree of freedom.

19. The method of claim 18 wherein the lens is a multi-element lens.

20. The method of claim 19 wherein the lens is an achromatic lens.

21. The method of claim 18 wherein the lens is a diffractive optical element.

22. The method of claim 18 wherein the lens is a hybrid lens.

23. The method of claim 18 wherein the reflecting surface is a diffractive element.

24. The method of claim 18 wherein the reflecting surface is an off-axis segment of a paraboloidal reflector.

25. The method of claim 18 wherein the reflecting surface is an aspheric mirror segment.

26. The method of claim 18 wherein a computer characterizes the displacement of the object according to aberrations in the output signal produced in the imaging system.

27. An optical target for attachment to an object, the target comprising a lens, a reflecting surface that angularly displaces and approximately collimates light, and a retroreflector that reflects collimated light in more than one optical plane, wherein the lens, the reflecting surface and the retroreflector are fixedly spaced apart and in optical connection with each other, and are maintained in a fixed physical relationship relative to each other, and wherein a beam of light passed through the lens optically contacts, in order, the reflecting surface, the retroreflector, the reflecting surface, and the lens to produce an output signal to an interferometer for simultaneously characterizing displacement of the object in more than one degree of freedom.

28. The optical target of claim 27 wherein the lens is a multi-element lens.

29. The optical target of claim 28 wherein the lens is an achromatic lens.

30. The optical target of claim 27 wherein the lens is a diffractive optical element.

31. The method of claim 27 wherein the lens is a hybrid lens.

32. The optical target of claim 27 wherein the reflecting surface is a diffractive element.

33. The optical target of claim 27 wherein the reflecting surface is an off-axis segment of a paraboloidal reflector.

34. The optical target of claim 27 wherein the reflecting surface is an aspheric mirror segment.

35. The optical target of claim 27 wherein the retroreflector is either a cube corner retroreflector or a spherical retroreflector.

36. The optical target of claim 27 wherein at least two of said lens, said reflecting surface and said retroreflector are constructed with a single monolithic element.

* * * * *